June 3, 1952  M. I. TAYLOR  2,599,141
REVERSIBLE SUMMER-WINTER COVER FOR BEEHIVES
Filed Dec. 27, 1948
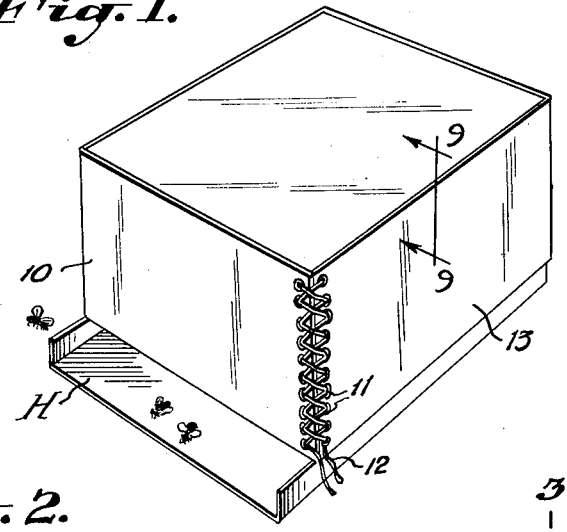
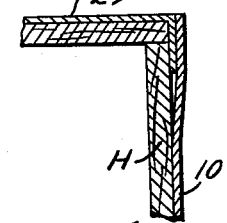
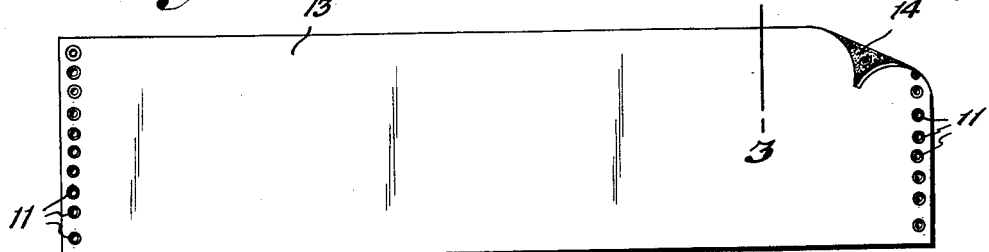
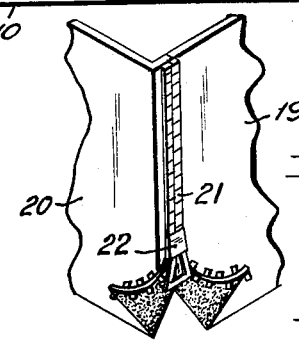
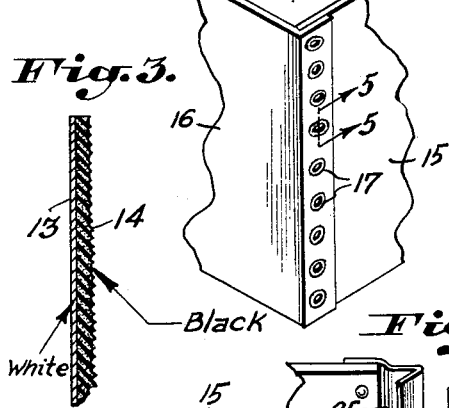
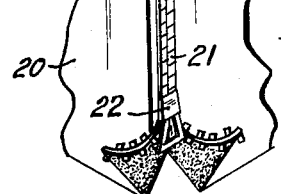
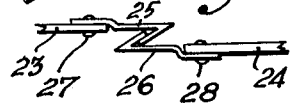
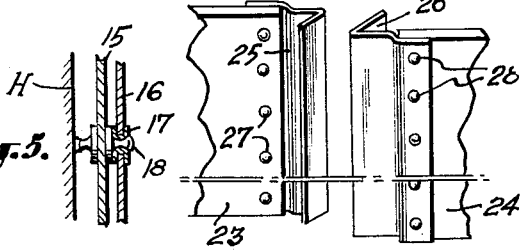
INVENTOR.
Merritt I. Taylor
BY
Elizabeth Newton Dew
ATTORNEY Patented June 3, 1952

2,599,141

UNITED STATES PATENT OFFICE 2,599,141

REVERSIBLE SUMMER-WINTER COVER FOR BEEHIVES

Merritt I. Taylor, Richmond, Va.

Application December 27, 1948, Serial No. 67,366

6 Claims. (Cl. 6—1)

This invention relates to a covering or wrapping for a beehive and, particularly to a cover of flexible material which can be reversed, as desired, and secured in position about a hive, for the purpose subsequently explained.

As a result of extensive study and experiment, I have found that colonies of bees are seriously affected and handicapped by extremes of temperature. In summer, during periods of extreme heat, the temperature within a hive goes so high as to affect the efficient work of the colony while in winter, a long extremely cold spell will cause the cluster within the hive to contract and become so immobile that the bees therein cannot get fresh stores of honey and, as a result, may starve. Furthermore, I have found that colonies of bees are seriously affected by the condensation and collection of moisture within the hive during the winter season resulting in a moldy damp and unhealthy condition therein. The cluster is continuously giving off heat and water vapor as a result of natural metabolism of the bees. Under certain conditions of relative humidity and temperature, as where the outside relative humidity is fairly high and the temperature is low, the moist warm air rising from the cluster is lowered below the dew point as it comes in contact with the cold walls of the hive. As a result, moisture collects on the walls and under side of the top and then drops down upon the combs, creating the aforesaid unhealthy condition within the hive.

It is therefore a principal purpose of my invention to provide a cover for a beehive which will operate in a natural and scientific way to reduce condensation within the hive, to keep the hive relatively cool in summer and to raise the temperature therein particularly the surface temperatures during cold days in winter, to level off extremes of heat and cold within the hive and thus create better conditions facilitating the work and improving the health of the colony, and enabling the cluster to move to fresh stores during the winter season.

More specifically, it is an object of the invention to provide a reversible cover of flexible material white on one side and black upon the other side whereby radiant heat waves from the sun are reflected away from the hive in summer when the white side is outermost, but absorbed into the hive during clear days in winter when the black side is outermost.

A further object is to provide a hive cover of the type aforesaid which is durable, inexpensive to manufacture, easy to apply and reverse as desired, and which has a dual action of heat reflection and insulation during the hot season.

Other objects and advantages will become apparent after a study of the following description in connection with the drawing wherein; in the drawing:

Figure 1 is a perspective view of a standard single beehive having my invention applied thereto.

Figure 2 is a development of the cover shown at Figure 1, one corner being turned down to show the black or light-absorbing side.

Figure 3 is a cross section of a portion of the model of Figures 1 and 2, taken in a plane indicated by the line 3—3 of Figure 2.

Figure 4 is a perspective view of the ends of a modification using snap fasteners.

Figure 5 is an enlarged cross section taken in a plane indicated by the line 5—5 of Figure 4.

Figure 6 is a perspective view of the ends of a second modification using a zipper fastener.

Figure 7 is a view of a third modification using bendable metallic clasps,

Figure 8 is a plan view of the modification of Figure 7 showing the clasps interengaged and about to be bent into final position, and Figure 9 is a sectional detail taken upon the line 9—9 of Figure 1.

Referring in detail to the drawing, H identifies a standard single rectangular hive with my invention applied thereto. As shown the cover consists of a single sheet or strip 10 of light gauge metal or any other suitable material shaped to wrap about the hive and having a width of about the same dimension as the height of the hive. The two meeting edges of the strip are provided with grommets 11 through which a lacing 12 may be passed to bind the cover firmly about the hive. As shown, the cover has its summer or light-reflecting surface 13 outermost.

From Figure 2 it will be noted that the other side 14 of sheet 10 is black so as to absorb rays from the sun. Figure 3 shows a cross section through a portion of the sheet; and it will there be noted that while the white or ray-reflecting side 13 is smooth and preferably glossy, the black or ray-absorbing side 14 is cellular or pitted as for example, sponge rubber. This cellular surface performs two functions. First, when it is outermost during the winter months, it acts to increase the ray-absorbing surface and to catch the rays as coming from a wide range of angles of incidence. Secondly, when the dark side is next to the hive during summer months, the cellular structure, in conjunction with the hive walls, forms small dead-air pockets or cells which increase the effectiveness of the covering in resisting the entrance of heat into the hive.

In Figure 4, I have shown a species in which the ends 15 and 16 of a strip, which has the same surface characteristics as the one shown upon Figures 1, 2 and 3, are secured in over-lapping relation by a series of aligned snap fasteners. Thus, for example, the end 16 may have a series of metal eyelets 17, while end 15 has a similarly-spaced series of snap fasteners 18. In Figure 5 I have shown each snap fastener as double, with a resilient extension from both sides of the sheet material. In this manner, the cover may be easily and quickly secured about the hive with either side outermost.

Figure 6 shows a modification using a double "zipper" or slidable fastener 21 and slide 22, to secure ends 19 and 20 in meeting relation and with either side outermost.

Figures 7 and 8 show a fourth modification wherein ends 23 and 24 of the cover material are secured together about the hive, with either side outermost, by a pair of bendable metallic hooks or clasps 25 and 26. Thus hook 25 may be attached to the end 23 by rivets 27, while hook 26 may be attached to end 24 by rivets 28. When it is desired to secure the cover about a hive, the strip is wrapped thereabout, and the ends interengaged as shown in Figure 8, and bent down to make a firm union between the two ends.

I have thus provided a reversible, dual-purpose cover for beehives which is of utility the year around. In the summer, the smooth white surface is outermost and reflects a substantial percentage of the sun's rays incident thereon to thereby prevent excessive temperatures within the hive. At the same time, the numerous air cells formed between the dark cellular surface and the hive walls, aid in preventing the entrance of heat by conduction into the beehive. In the winter, the black cellular surface is outermost and effectively absorbs the sun's rays incident thereon to thereby raise the temperature within the hive and assist in maintaining the interior thereof in a dry healthful condition and to enable the cluster to move to fresh stores of honey in the hive as required.

In addition to the strip of material 10, I may also use a reversible top 29 composed of the same material as 10 and having ray-absorbing and ray-reflecting sides. This top will consist of a rectangular portion of about the same size, or a little larger, than the top of the beehive and will have a relatively narrow down-turned edge of three or four inches in width formed integrally therewith or secured thereto. The top part will therefore fit over and about the hive and the upper edge of strip 10 secured thereabout and will be easily removed and replaced as desired to form a weather-tight enclosure about the hive.

Having now fully described the invention, what I claim and desire to secure by Letters Patent is:

1. A reversible cover for a beehive comprising a strip of woven fabric having a width substantially equal to the height of the hive and a length substantially equal to the perimeter of the hive, said strip having a light ray-reflecting surface covering the outside thereof and a dark ray-absorbing cellular surface covering the inside thereof, and interengaging means carried by the ends of said strip to secure the same in position about the side walls of the hive.

2. In a summer-winter cover for a beehive adapted to extend over and about the side walls of the hive, said cover comprising a strip of flexible bendable material and having a light ray-reflecting surface covering the outside thereof and a dark ray-absorbing surface covering the inside thereof, said cover being reversible to place said dark ray-absorbing surface outermost, when desired, and means carried by the end edges of said strip of flexible material to connect the same together and secure said strip about the hive.

3. A cover for a beehive, as recited in claim 2, said last-named means comprising a plurality of grommets spaced along each end of said strip.

4. A cover for a beehive as recited in claim 2, said last-named means comprising snap fasteners secured along each end edge of said strip, said snap fasteners interengaging to secure said strip about the hive.

5. A cover for a beehive as recited in claim 2, said last-named means comprising a slidable fastener having its interengaging elements secured to and along respective end edges of said strip.

6. A cover for a beehive as recited in claim 2, said last-named means comprising at least a pair of interengaging hooks of bendable sheet metal, each hook being secured to a respective end of said strip.

MERRITT I. TAYLOR.

REFERENCES CITED

The following references are of record in the file of this patent:

UNITED STATES PATENTS

| Number | Name | Date |
|---|---|---|
| 164,749 | McDaniel | June 22, 1875 |
| 1,449,058 | Robinson | Mar. 20, 1923 |
| 1,665,222 | Robinson | Apr. 10, 1928 |
| 1,871,595 | Eldred | Aug. 16, 1932 |
| 1,893,431 | Meier | Jan. 3, 1933 |
| 2,016,429 | Hayden | Oct. 8, 1935 |
| 2,065,402 | Schweller | Dec. 22, 1936 |

OTHER REFERENCES

ABC & XYZ of "Bee Culture," 1923 edition, by A. I. Root and E. R. Root, pages 903 and 904.